United States Patent [19]
Schwab

[11] 4,144,482
[45] Mar. 13, 1979

[54] DYNAMIC BRAKE CIRCUIT FOR MOTOR

[75] Inventor: Christopher M. Schwab, Cupertino, Calif.

[73] Assignee: Beckman Instruments, Inc., Fullerton, Calif.

[21] Appl. No.: 785,342

[22] Filed: Apr. 7, 1977

[51] Int. Cl.² .............................................. H02P 3/12
[52] U.S. Cl. .................................... 318/381; 318/379; 318/375; 318/534
[58] Field of Search ........ 318/245, 375, 376, 379–381, 318/530–537, 371, 377; 323/8, 9; 361/20

[56] References Cited
U.S. PATENT DOCUMENTS

| 2,627,597 | 2/1953 | Johansson | 318/381 |
| 3,633,093 | 1/1972 | Templeton, Jr. | 323/9 |

Primary Examiner—Robert K. Schaefer
Assistant Examiner—M. K. Mutter
Attorney, Agent, or Firm—R. J. Steinmeyer; F. L. Mehlhoff; F. J. Kowalski

[57] ABSTRACT

A brake circuit for a universal motor having an armature and a field winding normally connected in series therewith, the circuit including switch means operable to disconnect the power source and electrically connect the armature in series with the field winding and a brake resistor, with voltage limiting means in parallel with the field winding. The voltage limiting means include biasing diodes for maintaining the voltage across the field generally constant, resulting in a more even deceleration rate and a lower total brake time.

6 Claims, 3 Drawing Figures

DYNAMIC BRAKE CIRCUIT FOR MOTOR

BACKGROUND OF THE INVENTION

The background of the invention will be discussed in two parts:

1. Field of the Invention

This invention relates to a dynamic braking circuit for a motor and more particularly for a universal motor having an armature and a series field winding.

2. Description of the Prior Art

Many circuits have been devised for controlling the braking rate for total brake time for alternating current and direct current motors. Generally, the braking characteristics desired are selected according to the particular application in which the motor is used.

One of the more conventional methods of dynamic braking of a motor is the utilization of a brake resistor, which can be fixed in value or adjustable. In the normal universal type motor the armature is connected in series with the field winding during operation of the motor. When braking is desired, a switch is actuated which reconfigures the circuit to disconnect the power source and connect the armature and field in series with a brake resistor. Other means have also been devised, some of which are shown in the following U.S. Pat. Nos. 2,507,918; 3,107,321; 3,297,930; 3,319,143; 3,504,257; 3,548,276; 3,568,018; 3,628,112; 3,678,353; 3,786,329; 3,811,080; 3,851,233; and 3,991,352.

Some of the braking systems devised as illustrated in the above patents apply to single phase AC motors, multi-phase AC motors and DC motors.

U.S. Pat. No. 3,548,276 is directed to a dynamic braking circuit for universal motor wherein a capacitor is charged during periods of motor energization, the energy so-stored being delivered to the motor windings after de-energization to assure that adequate magnetic flux is present after de-energization to place the motor in a generative mode. During switching to the braking condition the field winding is connected in phase reversed relation and in series with the rotor winding and a diode.

In centrifuge applications, a motor is used to rotate a centrifuge rotor having equal angularly spaced pivotable containers about the periphery thereof. In such applications, due to the large mass of the rotor, uniform or approximately linear braking is desirable within a minimum braking time.

It is accordingly an object of this invention to provide a new and improved dynamic brake circuit.

It is another object of this invention to provide a new and improved dynamic brake circuit for a universal motor having an armature with a series field winding.

It is a further object of this invention to provide a new and improved dynamic brake circuit providing deceleration in an optimal time with the rate of change of the deceleration rate being more even.

SUMMARY OF THE INVENTION

The foregoing and other objects of the invention are accomplished by providing switch means in conjunction with a motor having an armature and a field winding, the switch being operable between a first position connecting the armature in series with the field winding for operating from a power source and, in the second position, connecting a brake resistor in series with the field winding and the armature. Upon actuation of the switch means into the second position diode biasing means are connected in parallel with the field winding to limit the voltage drop across the field and maintain the voltage across the field generally constant. Other switch means are provided for selectively coupling a second brake resistor in parallel with the diode biasing means or for shunting the diode biasing means to vary the braking rate.

Other objects, features and advantages will become apparent upon a reading of the specification when taken in conjunction with the drawings, in which like reference numerals refer to like elements in the several views.

DESCRIPTION OF THE PREFERRED EMBODIMENT

Figure 1:
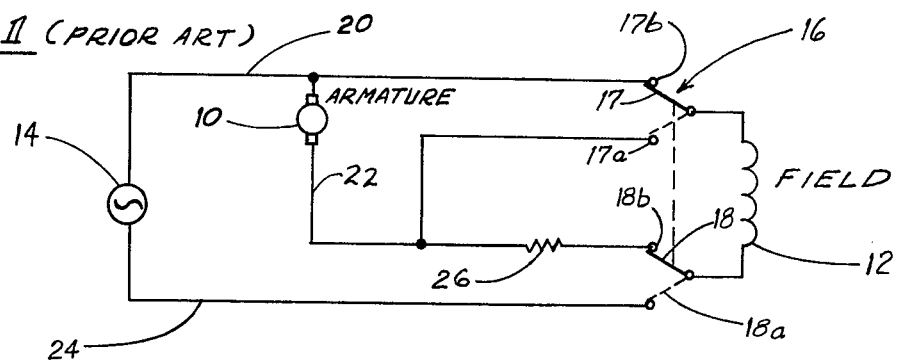
FIG. 1 is a schematic diagram of a prior art dynamic brake system utilizing a brake resistor.

Prior art dynamic braking circuits for universal motors, which are motors having an armature and a field winding connected in series during the operation thereof as a motor, for braking purposes a brake resistor is generally employed. As shown in FIG. 1, the motor includes an armature 10 and a field winding 12 adapted to be coupled in series and connected to a suitable power source 14, which may be alternating current. A double pull double throw switch, generally designated 16, has the first contact 17 mechanically coupled to the second contact 18 thereof for simultaneous operation. The switch 16 may be, for example, a double pole double throw relay or may be a manually-operated double pole double throw switch. In either event, the switch 16 is operable between a first and second position, the first position being the "run" position in which the motor is operating, and the second position being the "brake" position. The first or run position where the contacts 17 and 18 are designated 17a and 18a, respectively, while the second or brake position, has the stationary contacts designated 17b and 18b, respectively.

When the switches 17 and 18 are in the run position, as illustrated in dotted lines, the movable contacts thereof are contacting stationary contacts 17a and 18a, respectively, to complete a circuit. This circuit is from the power source 14 through lead 20 through the armature 10 through lead 22 to stationary contact 17a through the movable contact of switch 17 through the field winding 12, through the movable contact of switch 18 to stationary contact 18a through lead 24 to the other terminal of the power source 14. With this connection, the armature 10 is rotating under force of the field winding 12 and operating as a motor. To brake the motor a switch 16 is operated to its brake or second position, that being shown with the movable contacts in solid lines to connect the "b" stationary contacts in the circuit. In this mode, the energy remaining in the system causes the motor to operate as a generator until all the power therein is suitably dissipated. To assist in this dissipation of energy a brake resistor 26 is provided and with the switch 16 in its second position, the power source 14 is disconnected from the circuit. A circuit is then completed from the armature 10 through the brake resistor 26 through stationary contact 18b, through the movable contact of switch 18, through the field winding 12 through the movable contact of switch 17, through stationary contact 17b to the other terminal of armature 10. Effectively, the armature 10 is connected in series with the field winding 12 and in series with the brake resistor 26.

With a motor such as Carter Motor Company model MUC5053JF having a one-third horsepower rating and a maximum current of approximately 9 amps, when used with a table top centrifuge such as Spinco model TJ6, the motor is initially operating at 9000 r.p.m. to rotate the rotor at 6000 r.p.m. and takes approximately 2½ minutes to come to a complete halt. The speed versus time characteristics are as follows:

| ROTOR R.P.M. | TIME |
| --- | --- |
| 6,000 | 0 |
| 5,000 | 3 secs. |
| 4,000 | 6 secs. |
| 3,000 | 10 secs. |
| 2,000 | 17 secs. |
| 1,500 | 24 secs. |
| 1,000 | 57 secs. |
| 600 | 1 min. 28 secs. |
| 400 | 1 min. 46 secs. |
| 200 | 2 min. 5 secs. |
| 0 | min. 30 secs. |

Figure 3:
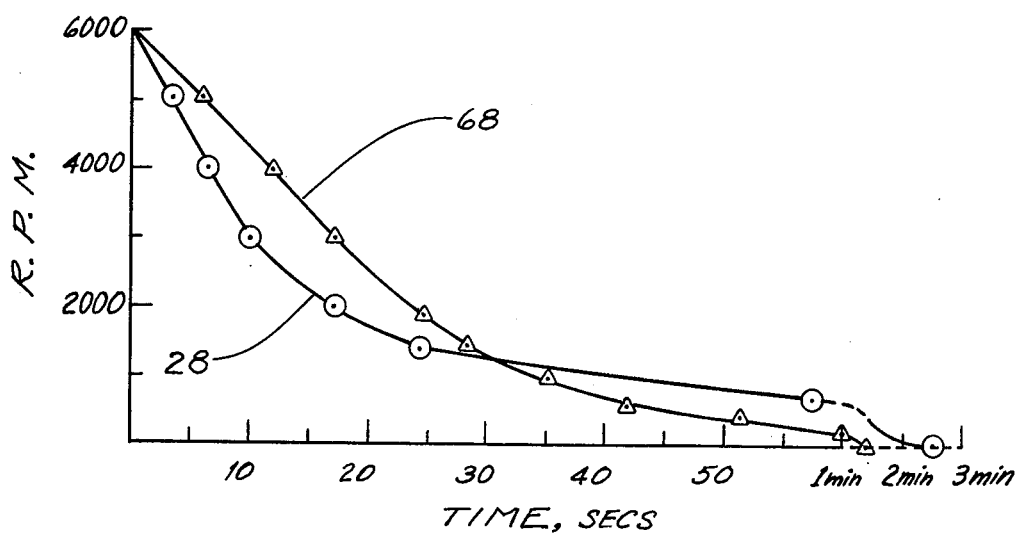
FIG. 3 is a graph illustrating the speed versus time characteristics of a motor used in the circuits of FIGS. 1 and 2.

The above table is graphically illustrated as curve 28 of FIG. 3, this curve corresponding to the use of a 15 ohm brake resistor 26 in the circuit of FIG. 1. The curve of FIG. 3, on the time scale which is the horizontal line, is depicted in increments of seconds out to 60 seconds or 1 minute. Thereafter the curves and the horizontal line are depicted in dotted lines to illustrate a change of scale to further depict that portion of the curve at the extreme right on a different scale in minutes.

The curve 28 has a plurality of circles with dots therein along the curve to designate the points determined by the table above in drafting the curve 28. As can be seen down to 3,000 r.p.m. the angle of the curve is rather steep providing a high deceleration rate, the curve then bending to a slower deceleration rate until, at approximately 1,500 r.p.m. to 1,000 r.p.m., the curve 28 is approaching a very slow deceleration rate requiring 33 seconds to decrease 500 r.p.m. in speed. During this time, from 24 seconds to 57 seconds the curve 28 is approaching an asymptotic relation to the horizontal. After 1,000 r.p.m. the internal friction generated by the mechanical components within the system assist in braking until at approximately 2½ minutes the armature 10 has come to a complete halt.

Viewing the circuit of FIG. 1, the voltage appearing across the field winding 12, as well as the armature 10 and the brake resistor 26, continually varies as the armature 10 decelerates. Such braking is not effective for completing stopping the motor armature since the braking action diminishes in relation to to the speed of the armature.

Figure 2:
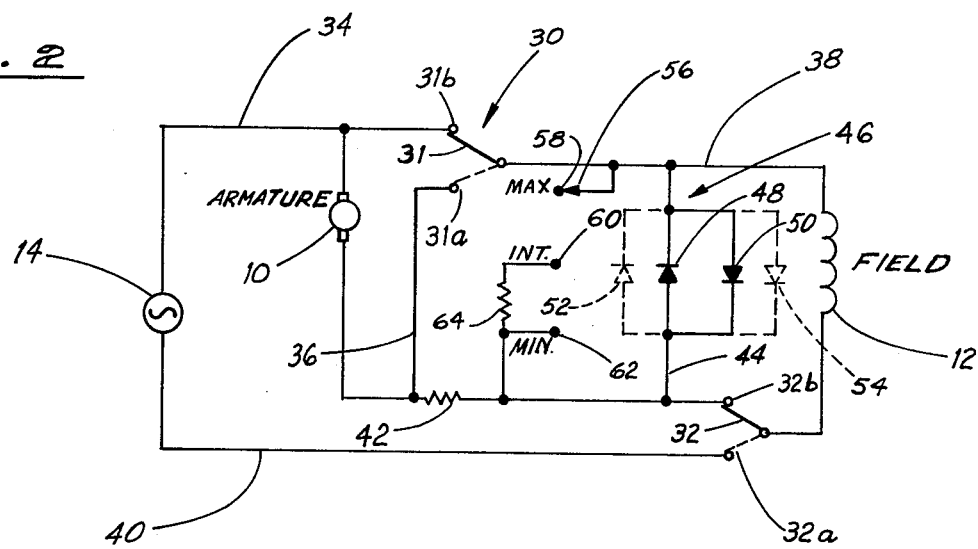
FIG. 2 is a schematic diagram of the dynamic brake system according to the invention.

In FIG. 2, the schematic diagram according to the present invention is illustrated wherein the armature 10 and field winding 12 are interconnected for motor operation through a double pole double throw switch generally designated 30 having movable contacts 31 and 32 operating between the first positions corresponding to stationary contacts 31a and 32a, respectively, and the second position utilizing stationary contacts 31b and 32b, respectively. With the switch 30 in its first position, a circuit is completed from the power source 14 over lead 34 through armature 10 through lead 36 to stationary contact 31a through movable contact 31 over lead 38 through the field winding 12, through the movable contact 32 through stationary contact 32a, and through lead 40 connected to the opposite terminal of power source 14. In this position, the armature 10 is operating as a motor and energized by power source 14.

When the switch 30 is operated to the solid line position shown in FIG. 2 braking is in effect, and the armature 10 is connected through stationary contact 31b through movable contact 31 over lead 38 through the field winding 12 through the movable contact 32 to the stationary contact 32b, through braking resistor 42 to the other terminal of armature 10. At a point intermediate stationary contact 32b in one end of brake resistor 42, a lead 44 is connected to provide voltage limiting means, generally designated 46, interconnected between lead 44 and lead 38 and in parallel with field winding 12. The voltage limiting means 46 includes a plurality of diodes 48 and 50, connected in back-to-back relation. That is, the diode 48 has the anode thereof coupled to lead 44 and the cathode thereof coupled to lead 38 while the diode 50 has the cathode coupled to lead 44 and the anode thereof coupled to lead 38. In dotted lines, two additional diodes 52 and 54 are shown, diode 52 being connected in parallel conductive relation with diode 48 while diode 54 is connected in parallel conductive relation with diode 50. Although the diodes 52 and 54 are not necessary to the invention, these two diodes provide redundancy in the event of failure of one of the diodes 48 and 50, if the failure is open circuit failure. Furthermore by utilization of four diodes as illustrated, a diode bridge pack may be used and can be for example, a model PK05 ten ampere bridge pack of the type manufactured by Electronic Devices, Incorporated. As can be seen, the connection of diodes 48 and 50 is such that the induced currents appearing at field winding 12 can flow in either direction through one of the diodes 48 or 50, once the forward voltage drop of the diodes 48 and 50 is exceeded. The forward voltage drop of the diode so-selected is approximately one volt and serves to maintain or limit the voltage appearing across the field winding 12 at a constant level.

To permit a variation in the deceleration rate upon braking, a second switch 56 has a movable contact operable between one of three positions designated 58, 60, and 62, respectively. The three stationary contact points 58, 60 and 62 are respectively designated for maximum, intermediate, or minimum braking. Switch 56 may be, for example, a rotary three-position switch in which the movable contact is electrically connected to lead 38 while stationary contact 62 is electrically connected to stationary contact 32b which is at the same potential as lead 44. Interconnecting terminals 60 and 62 of the switch 56 is a second braking resistor 64.

In the circuit illustrated in FIG. 2, instead of the 15 ohm brake resistor 26 used in FIG. 1, the brake resistor 42 has a value of 1 ohm with the other brake resistor 64 being 0.1 ohms. The value of the brake resistors 42 and 64 are empirically determined to get a reasonable braking time without the sudden deceleration rates shown in the curve 28 of FIG. 3. The AC power source 14 in FIG. 2 is approximately 115 volts while the motor utilized is the aforementioned one-third horsepower motor with a maximum starting current of approximately 9 amperes and a running current of 2½ amperes. In the centrifuge utilized for this application, the rotor diameter is 10 inches with an overall height of approximately 4 inches, the rotor weighing approximately 16 pounds. With the rotor operating at approximately 6000 r.p.m., a considerable amount of inertia is generated. Furthermore, when particles are being centrifuged from a sample, sudden changes in the deceleration rate can adversely affect the sample causing the otherwise centrifuged particles to return to a state of suspension, if aggitated. Consequently, for such critical samples, by eliminating the high rate of deceleration initially occurring as shown in curve 28 and providing the gradual deceleration shown in curve 68, the change in the rate of deceleration is not as sharp providing a more even braking action with less sample disturbance, in less time.

Utilizing the circuit of FIG. 2 with the second switch 56 at its maximum position, that is, connected to terminal 58, and switch 30 in its solid line or braking position, the speed versus time characteristics from a rotor speed of 6000 r.p.m. (or a motor speed of 9000 r.p.m.) is depicted by the curve 68 of FIG. 3, which is delineated by a plurality of triangular segments which are illustrative of the speed and time in the following table:

| ROTOR R.P.M. | TIME |
| --- | --- |
| 6,000 | 0 |
| 5,000 | 6 secs. |
| 4,000 | 11 secs. |
| 3,000 | 17 secs. |
| 2,000 | 24 secs. |
| 1,500 | 28 secs. |
| 1,000 | 35 secs. |
| 600 | 42 secs. |
| 400 | 51 secs. |
| 200 | min 9 secs. |
| 0 | 1 min 36 secs. |

Initially, as can be seen, the overall time for stopping as depicted by curve 68 is reduced by approximately 1 minute over that of the prior art circuit of FIG. 1, which is depicted by curve 28 in FIG. 3. With a stopping time for the same equipment of 1 minutes and 36 seconds versus the prior art brake circuit of 2 minutes and 30 seconds, the total braking time is reduced considerably. Furthermore, although the initial braking, or deceleration of the braking system of FIG. 2 is not as great, it can be seen in FIG. 3 that the deceleration characteristics are more linear and consequently more uniform, thus introducing fewer drastic changes in speed characteristics during the deceleration of the rotor.

In operation, after switch 30 is in the solid line position as shown in FIG. 2, with switch 56 at its maximum position, the diodes in parallel with the field limit the voltage across the field to that of the forward voltage drop of the diode which is approximately 1 volt, and the voltage drop remains fairly constant within 0.1 volts with changing current as the armature 10 decelerates. Since the voltage across the field winding 12 tends to remain constant during most of the braking period, the braking action, while not constant does not fall off as quickly as it does with the circuit of FIG. 1. As a result, the maximum deceleration at the high speed end can be lowered and the total brake time can be reduced. Two diodes 48 and 50, connected in parallel and in opposite conductive relation across the field winding 12 are needed since the direction of the generated current during the braking, can be in either direction.

If the switch 56 is rotated to its intermediate position, that is, with switch 56 contacting stationary contact 60, the resistor 64 which is 0.1 ohms, is placed in parallel with the voltage limiting means 46. In this position, the resistor 64 shunts some current around the field to produce an intermediate braking rate. With the switch 56 in the minimum braking position, that is, with contact 56 moved to stationary contact 62, the field winding is short circuited so that no current flows through the field and, hence, no current is allowed to build up in the loop. In the minimum braking position, the time required for stopping would approximate that of an unbraked motor coasting to a stop.

Consequently, with the circuit of FIG. 2, a dynamic brake circuit is provided for a universal motor to provide a deceleration rate without sharp changes in the braking rate, with means provided for placing a second brake resistor in parallel with voltage limiting means to provide other braking rates as desired for less critical samples. While there has been shown and described a preferred embodiment it is to be understood that various other adaptations and modifications may be made within the spirit and scope of the invention.

What is claimed is:

1. In a dynamic brake circuit for a universal motor having an armature and a field winding, the combination comprising:
    a brake resistor;
    voltage limiting means; and
    switch means operable between a first position and a second position, said first position connecting said armature in series with said field winding and to a power source, said second position disconnecting said power source and connecting said brake resistor in series with said field winding and with said armature and further connecting said voltage limiting means in parallel with said field winding whereby to decelerate said armature while maintaining the voltage across the field generally constant.

2. The combination according to claim 1 wherein said voltage limiting means includes diode means connected in parallel with said field winding for maintaining the voltage across the field winding at a voltage level generally equal to the forward voltage drop of said diode means.

3. The combination according to claim 2 wherein said diode means includes first and second diodes connected in parallel in opposing conductive relation and said power source is an alternating current power source whereby said first and second diodes permit current flow in either direction during the deceleration of said armature.

4. The combination according to claim 3 further including other switch means for selectively coupling another brake resistor in parallel with said field winding.

5. The combination according to claim 4 wherein the first brake resistor has a value of approximately 1 ohm and said second brake resistor has a value of approximately 0.1 ohms.

6. The combination according to claim 5 wherein said other switch means is operable to another position to shunt said field winding, the operation of said other switch means providing two other deceleration rates.

* * * * *